(12) United States Patent
Motzkau

(10) Patent No.: US 12,398,523 B2
(45) Date of Patent: Aug. 26, 2025

(54) FLOOD PROTECTION SYSTEM

(71) Applicant: Kai Motzkau, Velbert (DE)

(72) Inventor: Kai Motzkau, Velbert (DE)

( * ) Notice: Subject to any disclaimer, the term of this patent is extended or adjusted under 35 U.S.C. 154(b) by 0 days.

(21) Appl. No.: 19/001,719

(22) Filed: Dec. 26, 2024

(65) Prior Publication Data

US 2025/0215653 A1 Jul. 3, 2025

(30) Foreign Application Priority Data

Dec. 27, 2023 (DE) ...................... 10 2023 136 702.1

(51) Int. Cl.
| | | |
|---|---|---|
| *E03B 3/02* | (2006.01) | |
| *E02B 1/00* | (2006.01) | |
| *E02B 3/02* | (2006.01) | |
| *E02B 9/02* | (2006.01) | |
| *H02K 7/18* | (2006.01) | |

(52) U.S. Cl.
CPC ................ *E02B 3/02* (2013.01); *E02B 1/006* (2013.01); *E02B 9/025* (2013.01); *H02K 7/1823* (2013.01)

(58) Field of Classification Search
CPC ............ E02B 3/02; E02B 1/006; E02B 9/025; H02K 7/1823
See application file for complete search history.

(56) References Cited

U.S. PATENT DOCUMENTS

| | | | |
|---|---|---|---|
| 2004/0022584 A1* | 2/2004 | Sherman | E02D 17/18 405/303 |
| 2016/0273181 A1* | 9/2016 | Smith | E02D 19/22 |
| 2018/0051433 A1* | 2/2018 | Smith | E02B 3/108 |
| 2023/0057123 A1* | 2/2023 | Ivey | E02B 3/041 |

FOREIGN PATENT DOCUMENTS

| | | | |
|---|---|---|---|
| CH | 703550 A2 | 2/2012 | |
| DE | 7802709 U1 | 5/1978 | |
| DE | 102006001715 A1 | 7/2007 | |
| DE | 102011012777 A1 | 10/2012 | |
| DE | 102013109763 A1 | 3/2015 | |
| GB | 2469120 A * | 10/2010 | E02B 3/00 |
| WO | 2021240396 A1 | 12/2021 | |

* cited by examiner

*Primary Examiner* — Joseph Ortega
(74) *Attorney, Agent, or Firm* — Smartpat PLC

(57) ABSTRACT

A flood protection system (10) on a watercourse (16) with a flood-prone area (18) includes a main pipe (12) along the watercourse (16) in this flood-prone area (18). At least parts of the watercourse (16) are guided through the main pipe (12) in the direction of flow (28). A drive turbine (62) in the main pipe (12) increases the flow velocity of the flowing water (16) in the main pipe (12) in the event of flooding, the main pipe (12) flowing back into the flowing water (16).

11 Claims, 4 Drawing Sheets

FLOOD PROTECTION SYSTEM

CROSS-REFERENCE TO RELATED APPLICATION

This application claims the benefit of German Patent Application DE 10 2023 136 702.1, filed on Dec. 27, 2023, the content of which is incorporated by reference in its entirety.

BACKGROUND

In many river regions, flooding occurs when the river floods. This causes considerable economic damage to national economies. Flood waters often reach cities and destroy large parts of residential and industrial facilities. Flooding can also cause enormous damage to agriculture if the agricultural land is not specifically designed for this purpose. For this reason, dikes or dams are built along the course of rivers to prevent flooding or, if necessary, retention areas are designated against the increased volumes of water. In the case of rivers that flow through cities, such flood protection is often difficult due to the large amount of land required. For this reason, special flood walls are erected at the edges of rivers during floods. Due to their construction, dykes and dams are at risk of softening and breaking. They often consist of piled up sand and/or gravel, which is held together by the roots of plants. Flood walls are built every time there is a flood to provide flood protection. This incurs costs for the state and local authorities.

DE 102006001715 A1 describes a device for preventing water from overflowing from a river during floods, which provides a rigid hollow construction that does not allow water to pass through and is placed along the bank of the river. The construction is made of pipe halves, with the lower pipe halves permanently placed on the bank of the river. The upper pipe halves have an outer diameter that corresponds to the inner diameter of the lower pipe halves. These constructions serve on the one hand as a wall and on the other hand flowing water can be guided through them.

DE 10 2011 012 777 A1 relates to a device and a method for preventing flooding. Using a simple technical design, water is pumped from a flood-carrying river into a more distant flood basin with the aid of supply pipes and main pipes.

DE 10 2013 109 763 A1 relates to flood protection on a watercourse with an area at risk of flooding, containing a pipe along the watercourse in this area at risk of flooding, whereby parts of the watercourse are guided through the pipe in the direction of flow. A drive turbine is described in the pipe, which increases the flow velocity of the watercourse in the pipe. Floods occur because more water volume arrives in a river than can flow out of the river bed. The flow velocity is too low for the cross-section. The water overflows the riverbed and then seeks its destructive path into the surrounding area. The water can also flow through a pipe parallel to the river bed. This pipe contains a drive turbine that increases the flow speed. This allows more water volume to be transported in a controlled manner with the same river cross-section, e.g. past a city.

The known flood protection systems have the disadvantage that a flood basin must be provided to transport the water away from the flood-prone area. Furthermore, in normal conditions, the pipes carry the water unintentionally from the watercourse past the flood area. In warm periods with low water levels, the riverbed of the watercourse in the area of the flood zone can dry out quickly. This is particularly detrimental to the flora and fauna there.

SUMMARY

The disclosure relates to a flood protection system on a watercourse with a flood-prone area, comprising a main pipe along the watercourse in this flood-prone area, at least parts of the watercourse being directed through the main pipe in the direction of flow, a drive turbine being provided in the pipe to increase the flow velocity of the watercourse in the event of flooding in the pipe, the main pipe opening back into the watercourse.

The disclosed flood protection system avoids the disadvantages of the prior art and can also be used at normal water levels.

This is achieved by providing at least one branch element with at least two pipe branches in a flood protection system on a watercourse with an area at risk of flooding of the type mentioned at the beginning, the first pipe branch leading into the main pipe and the second pipe branch leading into a secondary pipe, the branch element being designed with an adjustable shut-off device which shuts off or releases a pipe branch. In this way, it is possible to decide whether water is led past the area at risk of flooding or directly back into the watercourse. This can prevent a river bed from drying out at relatively low water levels because the water is routed through the pipes.

An advantageous embodiment of the flood protection system on a watercourse with a flood-prone area is that the shut-off device has a gate valve that blocks the flow of the first pipe branch and/or the second pipe branch. There are several conceivable applications for the slide valve. On the one hand, the gate valve can block a branch. This means that water is no longer fed through the branch element. On the other hand, the gate valve can also be designed in such a way that it closes either one pipe or the other. This allows the water flow to be influenced. Either the water is diverted around the danger zone during high water or it flows directly back when the water level of the watercourse is normal.

A preferred embodiment of the flood protection system is achieved by the shut-off device having a mechanical, electrical, hydraulic or pneumatic drive for actuating the shut-off or release process. The shut-off device can thus be automated. It is now not necessary to actuate the shut-off device manually. The shut-off device is preferably operated by a drive.

In a particular embodiment of the flood protection system, a processor-controlled control unit is provided for the shut-off device. The control unit is provided for the automation of the shut-off device. The control system works with a microprocessor that can be easily programmed for the main control tasks. If required, the control unit can also be operated remotely via radio/mobile radio or cable in remote mode. The control unit adjusts the shut-off device in a suitable manner, for example by controlling the drive for the gate valve.

A further advantageous embodiment of the flood protection system is achieved by providing at least one water level sensor, which detects the water level of the flowing water and transmits it to the processor-controlled control system of the shut-off device for evaluation. To further increase the degree of automation, the control system can use the water level sensor to determine normal water levels or a flood. The shut-off device of the branch element can be automatically adjusted accordingly.

Preferably, the control unit then activates the shut-off device at a threshold value for the water level so that it releases or blocks either the first pipe branch or the second pipe branch.

In a particular embodiment of the flood protection system, artificial intelligence supports the control process. Here, the artificial intelligence can decide whether or not an emergency can actually arise due to flooding. The artificial intelligence can be trained with various scenarios. For example, artificial intelligence can be trained so that the bow wave of a ship does not trigger a flood emergency.

In a further preferred embodiment of the flood protection system, at least one pipe of the second pipe branch is led back into the flowing water, whereby a generator is provided in the second pipe branch to generate electricity. If there is no flood water, the generator in the second pipe branch can be used to generate electricity. The electricity generated in this way can be fed into the public grid for sustainable power generation.

Furthermore, a special design of the flood protection system on a watercourse can be achieved by providing a gradient for the second pipe branch. At a normal water level, the water is guided through the pipe until there is a sufficient gradient. The secondary pipe can then be returned to the watercourse. The kinetic energy of the returning water can be used to operate a generator to produce electricity.

One aspect of the invention is that in the flood protection system, at least one of the pipes is now arranged on an outer meander edge of the watercourse. This is where the flow velocity of the water is greatest, so that the greatest effect can be achieved here, for example with regard to a generator. Due to the increased flow velocity, there are also no or only very few fish in this area that could be unintentionally sucked into the pipe.

It has also proved to be an advantageous embodiment of the invention if an animal protection device is provided on the flood protection system, which prevents animals from entering the pipes. This prevents living creatures from being unintentionally guided through the pipes and coming to harm. For example, this can be achieved by a sieve-like or net-like construction.

Examples of embodiments are explained in more detail below with reference to the accompanying drawings. The invention is not intended to be limited solely to these listed embodiments. They merely serve to explain the invention in more detail.

DETAILED DESCRIPTION

Figure 1:
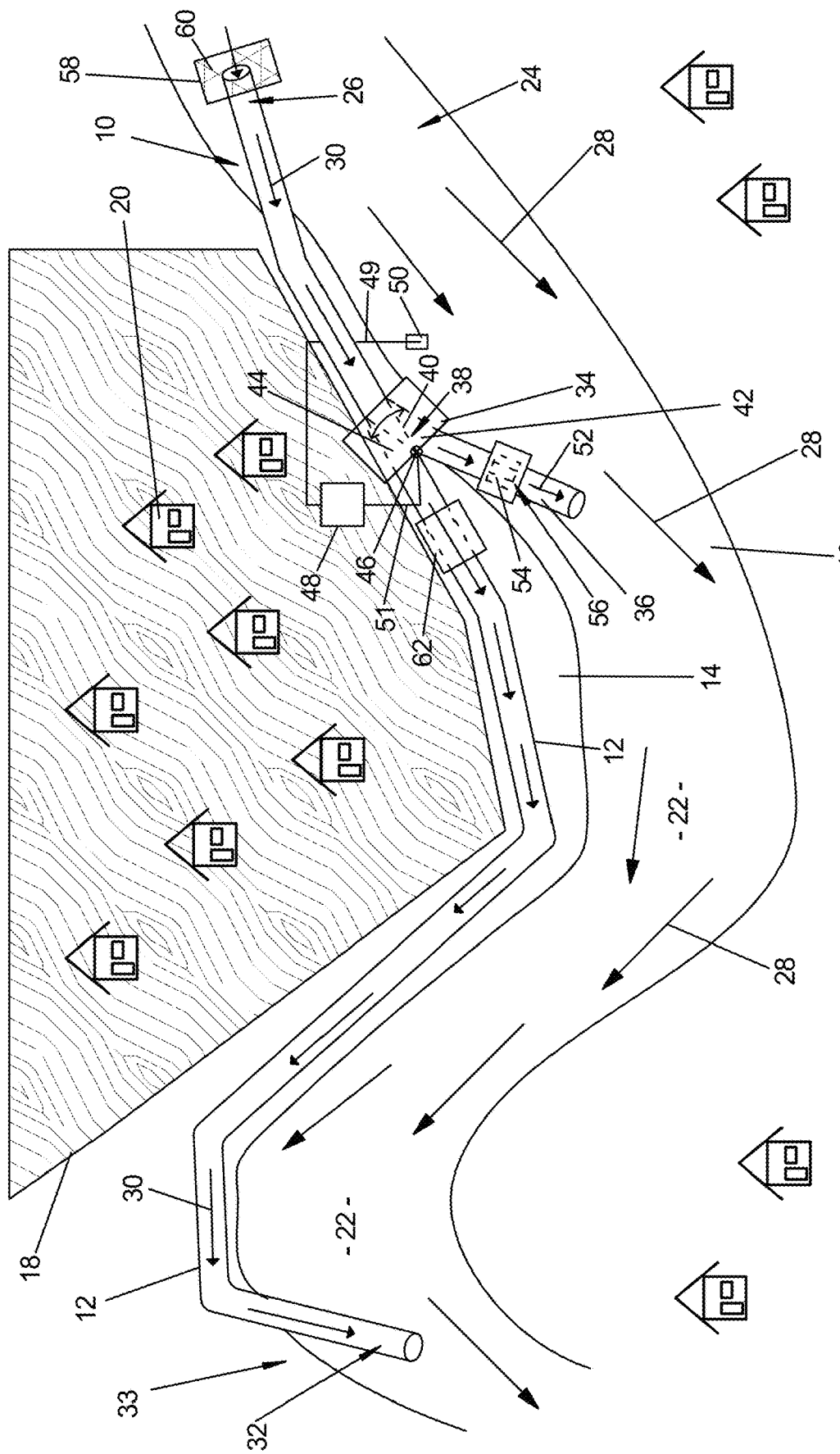
FIG. 1 shows a first example of a flowing body of water on which a flood protection system is arranged with a branching element with two pipe branches.

In FIG. 1, the reference sign 10 designates a flood protection system. The flood protection system 10 has a first pipe, the main pipe 12, which is guided along the shore 14 of a watercourse 16, such as a river, a stream or a canal. Buildings 20 of a village or town are preferably located in an area 18 at risk of flooding. When the watercourse floods, these buildings 20 are severely affected and can be considerably damaged by the overflowing water.

The main pipe 12 therefore receives water 22 in the higher upper area 24 of the watercourse 16 with an inlet pipe end 26. The direction of flow of the water 22 is indicated by the arrows 28 in the watercourse and by the arrows 30 in the main pipe 12. The main pipe 12 is led past the flood-prone area 18 and opens with a diverting pipe end 32 in a lower area 33 of the watercourse 16. The main pipe 12 forms a barricade against flooding and thus serves as flood protection itself. The main pipe 12 thus forms a bypass to the watercourse 16 in order to be able to move the water volumes more quickly around the flood-prone area 18.

In the upper area 24 of the flowing water 16, a branch element 34 is inserted in the main pipe 12. The branch element 34 diverts the flow direction 30 of the main pipe 12 into a second pipe, the secondary pipe 36. In this way, the water 22 entering the main pipe can be discharged directly back into the watercourse 16 upstream of the flood-prone area 18.

The branch element 34 has an adjustable shut-off device 38. The adjustable shut-off device 38 consists of a slide valve 40, which optionally directs the flow through the main pipe 12 or the secondary pipe 36. For this purpose, the shut-off device 38 blocks either a pipe branch 42 to the secondary pipe 36 or a pipe branch 44 to the main pipe 12. In this embodiment example, the slide valve 40 is driven by an electric motor 46 and pivoted into the desired position.

Figure 3:
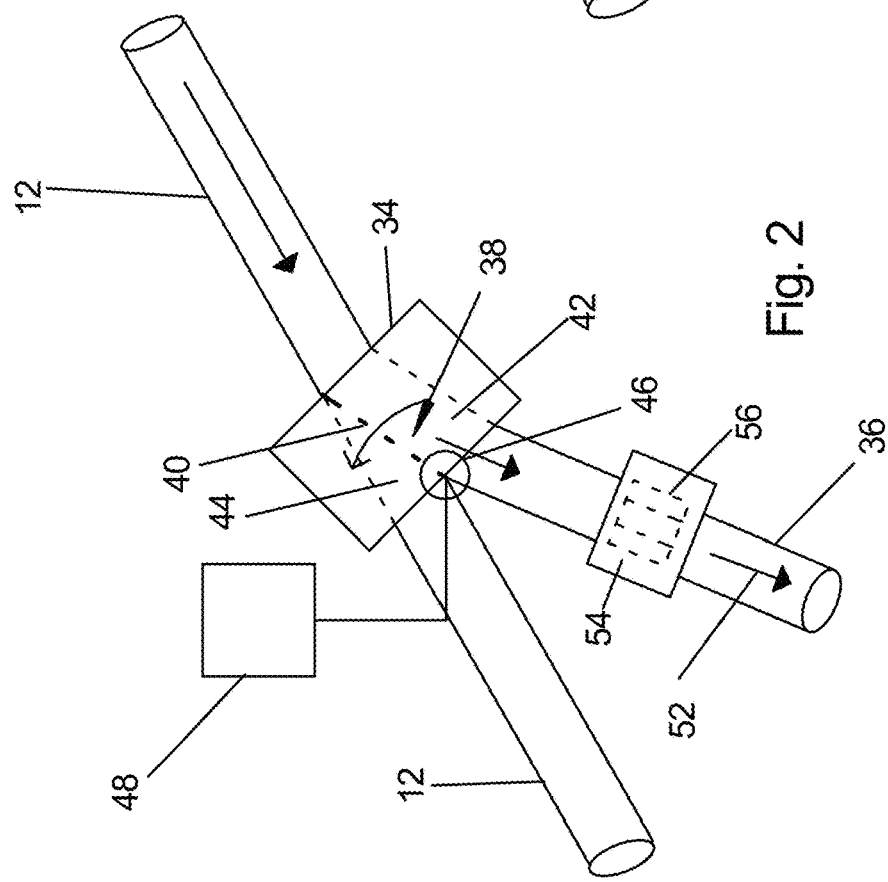
FIG. 3 shows an enlarged section of the branching element as shown in FIG. 1, with the shut-off device blocking the second pipe branch and releasing the first pipe branch.

The electric motor 46 is actuated by a microprocessor-controlled control unit 48. The control unit 48 receives a signal via a signal line 49 from a water level sensor 50. The water level sensor 50 supplies the current water level of the flowing water 16 as permanently as possible. The control unit 48 continuously evaluates the water level. If a certain threshold value is exceeded, the control unit 48 is activated. The control unit 48 controls the shut-off device 38 via a control line 51 in such a way that the pipe branch 42 to the secondary pipe 36 is blocked by the slide valve 40, as shown in FIG. 3. For this purpose, the electric motor 46 is activated, which closes the slide 40 in front of the pipe branch 42 to the secondary pipe 36. The control unit 48 is equipped with artificial intelligence. The artificial intelligence is trained in such a way that it can decide whether a flood is actually present. For example, it can prevent the bow wave of a ship from being recognized as high water.

If the water level sensor 50 signals that the water level is below the threshold value, the main pipe 12 is blocked accordingly with the slide valve 40.

Figure 2:
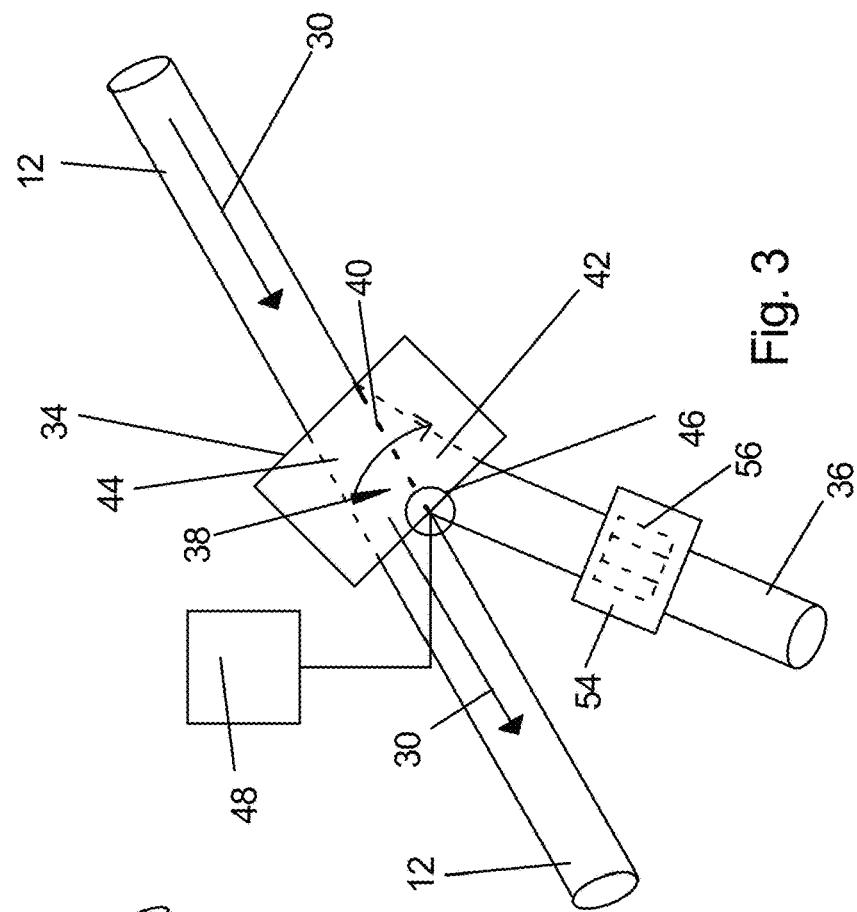
FIG. 2 shows an enlarged section of the branching element as shown in FIG. 1, with the shut-off device blocking the first pipe branch and releasing the second pipe branch.

At normal water levels, accelerated forwarding of the water around the flood-prone area 18 is not necessary. Therefore, in this case, the water is directed into the secondary pipe 36 with the branch element 34, as shown in FIG. 2. The direction of flow of the secondary pipe 36 is indicated by arrows 52. The secondary pipe 36 also discharges in the upper area 24 upstream of the flood-prone area 18. A generator 54 is arranged in the secondary pipe 36, which is driven by a turbine drive 56. The secondary pipe 36 is therefore arranged in such a way that there is a sufficient gradient to generate sufficient kinetic energy for the generator 54. The current from the generator 54 can, for example, supply the surrounding buildings 20 with electrical energy.

An animal protection device 58 is located in front of or at the inlet pipe end 26. This animal protection device 58 can, for example, be designed as a net or sieve 60, which prevents animals or plants from unintentionally entering the main pipe 12.

In the event of high water, the branch element 34 is set so that only the main pipe 12 is passable. A drive turbine 62 draws the water 22 from the watercourse 16 into the main pipe 12. The water 22 is accelerated by the drive turbine 62, diverted around the flood-prone area 18 with increased flow velocity and reintroduced into the watercourse 16 in the lower area.

FIG. 2 shows an enlarged section of the branching element 34 as shown in FIG. 1. Here, the shut-off device 38 blocks the pipe branch 44 to the main pipe 12. The pipe branch 42 to the secondary pipe 36 is unblocked, as described above. The water 22 thus flows through the secondary pipe 36 in the direction of flow 52, driving the generator 54 to generate electricity. This operating mode is used when the water level is normal. The main pipe 12 is not used in this position of the slide valve 40. The slide valve 40 is adjusted via the electric motor 46. The control unit 48 regulates the electric motor 46 and thus also the position of the slide valve 40.

FIG. 3 shows an enlarged section of the branching element 34 as shown in FIG. 1. Here, the shut-off device 38 blocks the pipe branch 42 to the secondary pipe 36. The pipe branch 44 to the main pipe 12 is unblocked as described above. This operating mode is used during high water. The water 22 thus flows through the main pipe 12 in the direction of flow 30. The secondary pipe 36 is not used in the present position of the slide valve 40. The slide valve 40 is adjusted via the electric motor 46. The control unit 48 regulates the electric motor 46 and thus also the position of the slide valve 40.

Figure 4:
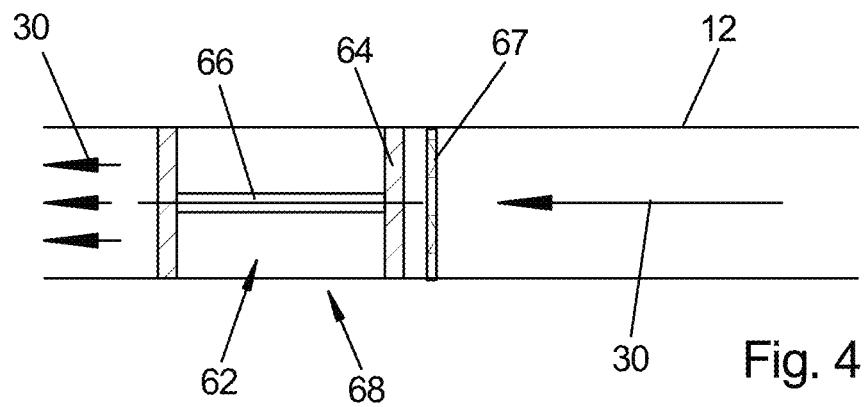
FIG. 4 shows a section of the first pipe with a drive turbine as shown in FIG. 1.

FIG. 4 shows a section of the main pipe 12 with the drive turbine 62 according to FIG. 1. The main pipe 12 of the flood protection system 10 is shown as a schematic sketch in a longitudinal section. The drive turbine 62 is provided inside the main pipe 12. The drive turbine 62 contains turbine blades 64, which are arranged rotationally symmetrically on a drive shaft 66. The turbine blades 64 are designed in such a way that when the drive shaft 66 rotates, they accelerate the water flowing through in the direction of flow corresponding to the arrows 30. Guide vanes 67 direct the water 22 onto the turbine blades 64 at an optimum angle, thus ensuring that the volume of water flowing through the main pipe 12 is considerably increased in a time interval due to the higher flow velocity. The flow velocity through the main pipe 12 can be adapted to the respective flood. The drive turbine 62 also operates in a known reverse function as an electrical generator 68, which can feed its electrical energy into the power grid.

Figure 5:
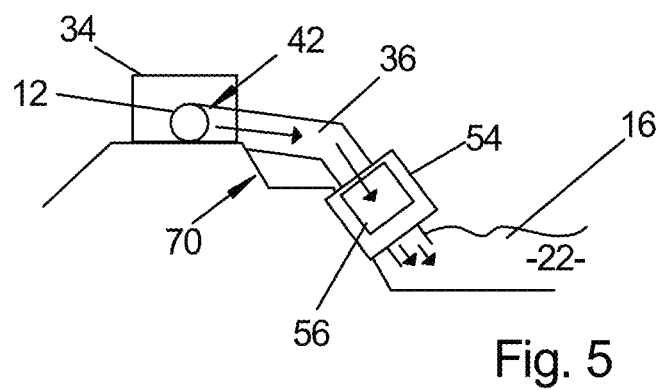
FIG. 5 shows a cross-section through the flood protection system according to FIG. 1 in the area of the second pipe junction.

FIG. 5 shows a cross-section through the flood protection system 10 according to FIG. 1 in the area of the pipe junction 42 to the secondary pipe 36. The secondary pipe 36 is arranged in such a way that it has a gradient 70. The water 22 flowing through the secondary pipe 36 can transfer its kinetic energy to the generator 54 via the turbine drive 56. The water 22 then flows back into the watercourse 16. This operating mode can be set primarily at a normal water level of the watercourse 16 with the branch element 34.

Figure 6:
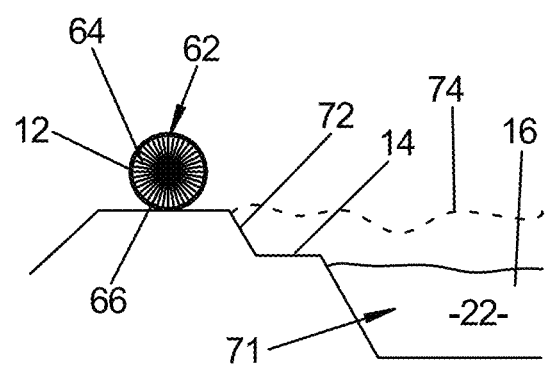
FIG. 6 shows a cross-section through the flood protection system FIG. 1 in the area of the drive turbine.

FIG. 6 shows a partial section of the watercourse 16 in cross-section. The watercourse 16 is located in its riverbed 71. At high water, the water 22 flows over the shore 14 up to a dam 72. The dashed line 74 indicates the water surface at high water. The solid line 76 in the riverbed 71 shows the water surface at normal water 76. The water 22 only reaches the shore 14. To prevent the dam 72 from also being flooded, the drive turbine 62 in the main pipe 12 can be switched on in the present embodiment example. As a result, in addition to the volume of water transported through the riverbed 71, considerable quantities of water are also directed through the main pipe 12. The amount of water regularly depends on the power of the drive turbine 62. The higher the output, the more water 22 flows through the main pipe 12 of the flood protection system 10. The main pipe 12 also serves as a stable wall for flood protection or to stabilize at least the dam 72.

The drive turbine 62 has the turbine blades 64, which are arranged rotationally symmetrically around the drive shaft 66. The turbine blades 64 force the water 22 through the main pipe 12 at high pressure and thus at an increased speed.

Figure 7:
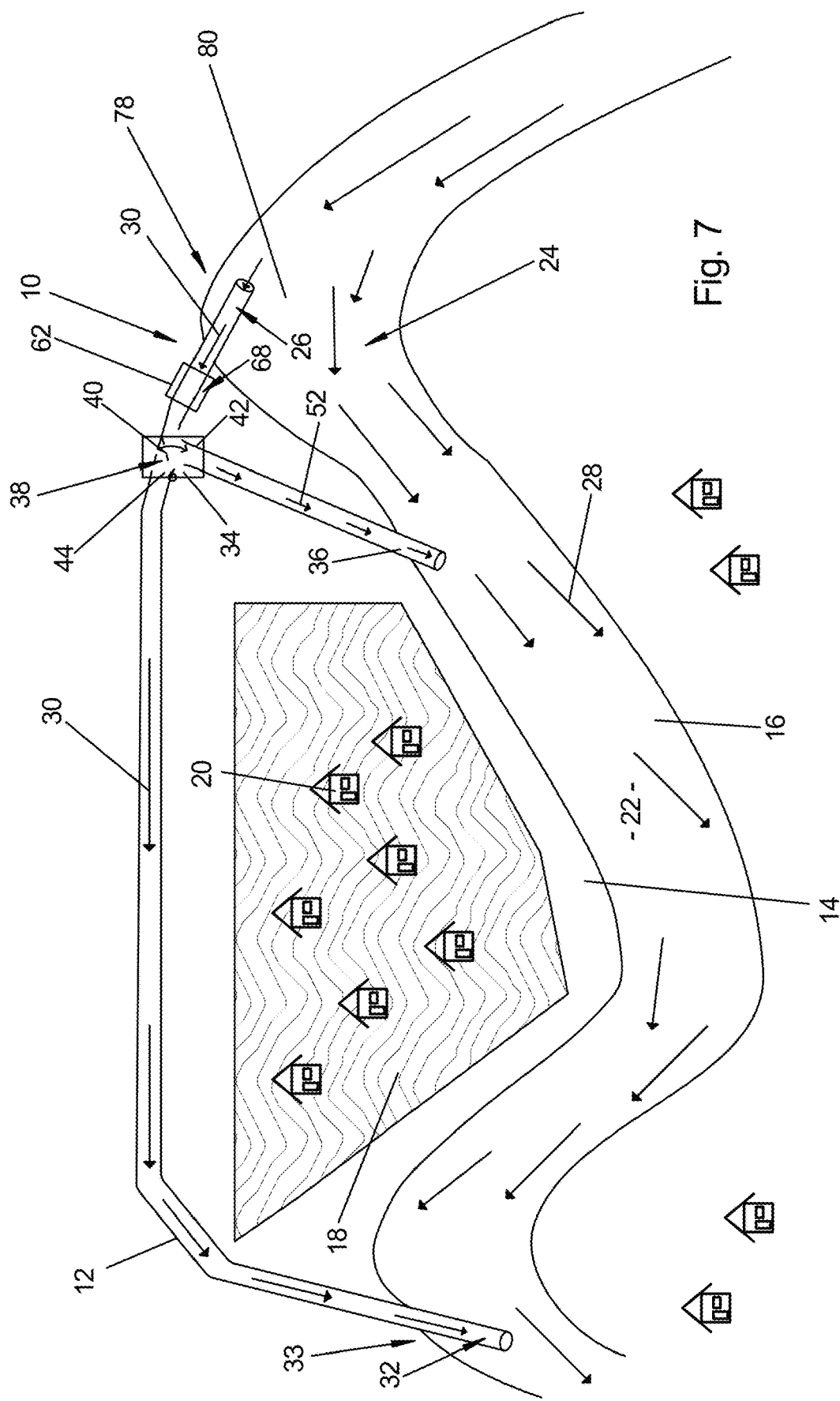
FIG. 7 shows a second embodiment example for a flowing body of water on which a flood protection system is arranged with a branching element with two pipe branches.

FIG. 7 shows the flood protection system 10. The flood protection system 10 also has the main pipe 12, which in this embodiment example is routed along the shortest possible route past the flood-prone area 18 with its buildings 20. The buildings 20 are symbolic of a village, a small settlement or a town. When the watercourse floods, these buildings 20 are severely affected and can be significantly damaged by the overflowing water.

In this embodiment example, the main pipe 12 therefore also receives the water 22 in the higher upper area 24 of the watercourse 16 with the inlet pipe end 26. The inlet pipe end is located in the outer area 78 of a meander 80 of the watercourse 16. Due to the high flow velocity of the watercourse 16, practically no living creatures, in particular fish, are present in this outer area 78. This can also make an animal protection device 58, as shown in the embodiment example of FIG. 1, superfluous.

The direction of flow of the water 22 is indicated by the arrows 28 in the watercourse 16 and by the arrows 30 in the main pipe 12. The main pipe 12 is led past the flood-prone area 18 and flows into the lower area 33 of the watercourse 16 with the diverting pipe end 32. The main pipe 12 thus forms a bypass to the watercourse 16 in order to be able to move the water faster around the flood-prone area 18.

In the upper section 24 of the watercourse 16, the branch element 34 is inserted in the main pipe 12. The branch element 34 diverts the flow direction 30 of the main pipe 12 into the secondary pipe 36. In this way, the water 22 entering the main pipe 12 can be discharged directly back into the watercourse 16 upstream of the flood-prone area 18.

In accordance with the embodiment example of FIG. 1, the branching element 34 has the adjustable shut-off device with the slide valve 40, which optionally directs the flow through the main pipe 12 or the secondary pipe 36. For this purpose, the shut-off device 38 blocks either a pipe branch 42 to the secondary pipe 36 or a pipe branch 44 to the main pipe 12. the mode of operation of the branching element 34 corresponds to the embodiment examples described above.

At normal water levels, accelerated forwarding of the water around the flood-prone area 18 is not necessary. Therefore, in this case, the water is directed into the secondary pipe 36 with the branch element 34, as shown in FIG. 2. The direction of flow of the secondary pipe 36 is indicated by arrows 52. The secondary pipe 36 also opens in the upper area 24 upstream of the flood-prone area 18. The generator 68 is arranged upstream of the branch element 34. The generator 68 is driven by the turbine drive 62. The secondary pipe 36 is designed in such a way that there is a sufficient gradient to generate sufficient kinetic energy for the generator 54. The current from the generator 68 can, for example, supply the surrounding buildings 20 with electrical energy.

In the event of high water, the branch element 34 is set so that only the main pipe 12 is passable. The generator 68 is then operated in reverse function as an electric motor, which drives the turbine drive 56. The turbine drive 56 then draws the water 22 from the flowing water 16 into the main pipe 12. The water 22 is accelerated by the drive turbine 62 and diverted around the flood-prone area 18 at an increased flow velocity and reintroduced into the watercourse 16 in the lower section.

LIST OF REFERENCE NUMBERS

10 Flood protection system
12 Main pipe
14 Shore
16 Watercourse
18 Flood-prone area
20 Buildings
22 Water
24 Upper area
26 Inlet pipe end
28 Flow direction in the watercourse
30 Flow direction in the main pipe
32 Diverting pipe end
33 lower area
34 Branch element
36 Secondary pipe
38 Shut-off device
40 Slide valve
42 Pipe branch to the secondary pipe
44 Pipe branch to the main pipe
46 Electric motor
48 Control unit
49 Signal line
50 Water level sensor
51 Control line
52 Flow direction of the secondary pipe
54 Generator
56 Turbine drive
58 Animal protection device
60 Sieve
62 Drive turbine
64 Turbine blades
66 Drive shaft
67 Guide vanes
68 Generator
70 Gradient
71 Riverbed
72 Dam
74 High water
76 Normal water
78 outer area
80 Meander

What is claimed is:

1. A flood protection system (10) on a watercourse (16) with a flood-prone area (18), comprising:
a main pipe (12) arranged along the watercourse (16) in the flood-prone area (18),
wherein at least a part of flowing water of the watercourse (16) is guided through the main pipe (12) in a direction of flow (28);
a drive turbine (62) provided in the main pipe (12) for increasing a flow velocity of the part of flowing water in the main pipe (12) during flooding, wherein the main pipe (12) opens into the watercourse (16);
at least one branching element (34) with at least two pipe branches (42, 44),
wherein a first pipe branch (44) of the at least two pipe branches (42, 44) leads into the main pipe (12) and a second pipe branch (42) of the at least two pipe branches (42, 44) leads into a secondary pipe (36),
wherein the branching element (34) is formed with an adjustable shut-off device (38) which shuts off or releases at least one of the at least two pipe branches (42, 44).

2. The flood protection system (10) according to claim 1, wherein the adjustable shut-off device has a slide valve (40) which blocks the first pipe branch (42) and/or the second pipe branch (44).

3. The flood protection system (10) according to claim 1, wherein the adjustable shut-off device (38) has a mechanical, electrical, hydraulic, or pneumatic drive for actuating a shut-off or release operation.

4. The flood protection system (10) according to claim 1, wherein a processor-controlled control unit (48) is provided for the adjustable shut-off device (38).

5. The flood protection system (10) according to claim 4, further comprising a water level sensor (50),
wherein the water level sensor (50) detects a water level of the watercourse (16) and transmits the water level to the processor-controlled control unit (48) of the adjustable shut-off device (38) for evaluation.

6. The flood protection system (10) according to claim 5, wherein the processor-controlled control unit (48) activates the adjustable shut-off device (38) at a threshold value for the water level and releases or blocks either the first pipe branch (42) or the second pipe branch (44).

7. The flood protection system (10) according to claim 4, wherein an artificial intelligence supports a control process of the processor-controlled control unit (48).

8. The flood protection system (10) according to claim 1, wherein the secondary pipe (36) of the second pipe branch (42) is led back into the watercourse (16), and
wherein a generator (54) for generating electricity is provided in the second pipe branch (42).

9. The flood protection system (10) according to claim 8, wherein a gradient is provided for the second pipe branch (42).

10. The flood protection system (10) according to claim 1, wherein at least one of the main pipe (12) or the secondary pipe (36) is arranged on an outer area (78) of a meander (80) of the watercourse (16).

11. The flood protection system (10) according to claim 1, further comprising an animal protection device (58) which prevents entry of animals into the main pipe (12).

* * * * *